(12) United States Patent
Stewart

(10) Patent No.: US 6,358,873 B1
(45) Date of Patent: Mar. 19, 2002

(54) NEODYMIUM GLASS FOR TUNGSTEN-HALOGEN LAMP ENVELOPES AND FILTERS

(75) Inventor: Ronald L. Stewart, Elmira, NY (US)

(73) Assignee: Corning Incorporatedc, Corning, NY (US)

( * ) Notice: Subject to any disclaimer, the term of this patent is extended or adjusted under 35 U.S.C. 154(b) by 12 days.

(21) Appl. No.: 09/594,475

(22) Filed: Jun. 15, 2000

Related U.S. Application Data

(60) Provisional application No. 60/142,094, filed on Jul. 2, 1999.

(51) Int. Cl.⁷ ............................ C03C 3/095; H01J 61/30
(52) U.S. Cl. ............................ 501/64; 501/66; 501/67; 501/70; 313/25; 313/636
(58) Field of Search ............................ 501/64, 66, 67, 501/70; 313/25, 636

(56) References Cited

U.S. PATENT DOCUMENTS

| | | | |
|---|---|---|---|
| 3,496,401 A | 2/1970 | Dumbaugh | 313/221 |
| 3,830,749 A | 8/1974 | Deeg et al. | 252/301.4 |
| 3,978,362 A | 8/1976 | Dumbaugh, Jr. et al. | 313/221 |
| 4,255,198 A | 3/1981 | Danielson | 106/52 |
| 4,288,250 A | 9/1981 | Yamashita | 501/78 |
| 4,302,250 A | 11/1981 | Danielson | 501/70 |
| 4,315,186 A | 2/1982 | Hirano et al. | 313/111 |
| 4,376,829 A | 3/1983 | Daiku | 501/64 |
| 4,390,637 A | 6/1983 | Daiku | 501/64 |
| 4,394,453 A | 7/1983 | Dumbaugh, Jr. | 501/66 |
| 4,454,446 A | 6/1984 | Kobayashi | 501/66 |
| 4,521,524 A | 6/1985 | Yamashita | 501/64 |
| 4,605,632 A | 8/1986 | Elmer | 501/54 |
| 4,693,987 A | 9/1987 | Danielson | 501/70 |
| 5,077,240 A | 12/1991 | Hayden | 501/67 |
| 5,548,491 A | 8/1996 | Karpen | 362/61 |
| 6,069,100 A | * 5/2000 | Naumann et al. | 501/67 |
| 6,118,216 A | * 9/2000 | Marlor | 313/636 |
| 6,268,696 B1 | * 7/2001 | Dolan et al. | 313/570 |
| 6,284,686 B1 | * 9/2001 | Marlor | 501/64 |

FOREIGN PATENT DOCUMENTS

| | | |
|---|---|---|
| EP | 0 999 574 | 5/2000 |
| GB | 1 318 640 | 5/1973 |

* cited by examiner

*Primary Examiner*—Karl Group
(74) *Attorney, Agent, or Firm*—Anca C. Gheorghiu; Timothy M. Schaeberle

(57) ABSTRACT

A glass for tungsten halogen lamp glass envelopes, glass filter lenses, and glass filters consisting essentially in terms of weight percent on the oxide basis, of about 50–62% $SiO_2$, 10–17% $Al_2O_3$, 0–6% $B_2O_3$, 3.6–10% CaO, 0–7.5% MgO, 0.1–0.3% SrO, 2.4–18% BaO, 0–1% ZnO, 1–8% $Nd_2O_3$. The glass exhibits the following physical properties: strain point between about 665° C. to about 750° C., coefficient of thermal expansion to the set point of between about 49–59× $10^{-7}$/° C., liquidus temperature below 1320° C., viscosity at liquidus temperature greater than 2,000 poises, and transmission at 585 nm of between 5–60% for a 1.2 mm thickness. The lamp color temperature for a tungsten halogen lamp containing a glass envelope, a glass filter lens, or a glass filter prepared from the glass composition is increased from about 3 to 7% above a similar glass with no $Nd_2O_3$, and the total visible lumen loss is limited to less than about 10%.

16 Claims, 2 Drawing Sheets

NEODYMIUM GLASS FOR TUNGSTEN-HALOGEN LAMP ENVELOPES AND FILTERS

CROSS REFERENCE TO RELATED APPLICATION

This application claims the benefit of U.S. Provisional Application Ser. No. 60/142,094, filed Jul. 2, 1999 entitled Glass for Tungsten-Halogen Lamp Envelope by Ronald L. Stewart.

FIELD OF THE INVENTION

The present invention relates to a glass suitable for manufacturing high temperature lamp envelopes such as tungsten-halogen lamp envelopes, as well as glass suitable for manufacturing high temperature glass filters and glass filter lenses, such as those used with tungsten-halogen lamps. More specifically, the present invention relates to $Nd_2O_3$ containing glass compositions that provide tungsten-halogen lamps with a higher correlated color temperature (CCT), thereby making the emitted light whiter, which can aid illuminated surroundings contrast.

BACKGROUND OF THE INVENTION

In the automotive industry there is a continued need for automobile headlights which provide better illumination of the surrounding environment. In recent years tungsten-halogen lamps have gained popularity over conventional incandescent sealed beam lamps due to several advantages which include: a whiter light emitted; a smaller size lamp produces an equivalent or even greater quantity of light; the intensity of the illumination remains virtually constant over the life of the lamp; and, the service life is significantly longer. In spite of these advantages, however, tungsten-halogen lamps can be improved especially with respect to illumination and contrast performance. This may be achieved, for example, by manufacturing the lamp envelopes out of glass that gives the tungsten-halogen lamp a higher CCT.

Because tungsten-halogen lamps operate at high temperatures, generally between about 500–700° C., suitable glasses for these lamp envelopes must be thermally stable (resist devitrification) and withstand thermal deformation at high temperatures. Additionally, the glass must permit a seal to the molybdenum leads while maintaining integrity through lamp operation. The glass must also be able to be economically formed into good quality tubing or pressed into filters and lens filter shapes.

Hence, much research has been concentrated upon alkaline earth aluminosilicate glasses because such are suitable for mass production of tungsten-halogen lamp envelopes, while concurrently manifesting the properties necessary for lamp operation.

U.S. Pat. No. 3,496,401 (Dumbaugh) describes the basic mechanism underlying the operation of tungsten-halogen incandescent lamps with specific reference to tungsten-iodide lamps. U.S. Pat. No. 3,496,401 discloses alkaline earth metal aluminosilicate glass compositions suitable as envelopes for such lamps, wherein the glass compositions consist essentially, expressed in weight percent on the oxide basis, of 10–25% alkaline earth metal oxide, 13–25% $Al_2O_3$, 55–70% $SiO_2$, 0–10% $B_2O_3$, and less than 0.1% alkali metal oxide.

U.S. Pat. No. 3,978,362 (Dumbaugh et al.) discloses glasses designed for tungsten-bromine lamp envelopes displaying strain points greater than 700° C., liquidus viscosities of at least 100,000 poises, operable melting temperature no higher than 1550° C., liquidus temperature less than 1200° C., and coefficients of thermal expansion between 48–55×$10^{-7}$/° C., the glass composition consisting essentially, in weight percent, of 14–21% CaO, 0–5% MgO, 0–7% BaO, the total CaO+MgO+BaO being at least 19%, 13–16% $Al_2O_3$, 0–10% SrO and/or $La_2O_3$ and 58–63% $SiO_2$.

U.S. Pat. No. 4,060,423 (Thomas) described another group of glass compositions particularly designed for use envelopes for tungsten-halogen lamps. Those glasses are characterized as exhibiting a liquidus temperature no greater than 1250° C., a strain point of at least 725° C., and a coefficient of expansion of about 42–48×$10^{-7}$/° C. The compositions therefor consist essentially, expressed in terms of weight percent on the oxide basis, of 55–68% $SiO_2$, 15–18% $Al_2O_3$, 6–13% CaO, and 6–16% BaO, wherein the weight ratio $Al_2O_3$:CaO+BaO is about 0.6:1 to 1:1.

U. Pat. No. 4,255,198 (Danielson et al.) discloses glasses suitable for sealing to molybdenum metal, in tungsten-halogen lamps, and having a strain point in excess of 730° C., a liquidus temperature of at least 40,000 poises, axial compression at room temperature not exceeding 350 PPM and axial compression or tension not exceeding 150 PPM at 500° C., a coefficient of thermal expansion between 43–48×$10^{-7}$/° C. The glasses have a composition consisting essentially, in terms of weight percent on the oxide basis, of: 62–64% $SiO_2$, 14–16% $Al_2O_3$, 10–13% CaO, and 7–9% SrO.

U.S. Pat. No. 4,302,250 (Danielson) discloses glasses for use as envelopes for tungsten-halogen lamps displaying strain points higher than 750° C., liquidus viscosities of at least 40,000 poises, liquidus temperatures below 1300° C. and coefficients of thermal expansion between 48–55×$10^{-7}$/° C., consisting essentially, in weight percent, of 11–14% CaO, 2–6.5% SrO+BaO, consisting essentially of 0–4% SrO and 0–5% BaO, 16.5–18.5% $Al_2O_3$, and 64–68% $SiO_2$.

U.S. Pat. No. 4,605,632 (Elmer) discloses a high silica glass for the production of envelopes for tungsten-halogen lamps, consisting essentially, by weight, of 1–2.5% $Al_2O_3$, 0.25–1% CaO, 0.1–0.25 $Na_2O$ and/or $K_2O$, 2.5–3.5% $B_2O_3$, 0.15–0.3% F., and the remainder $SiO_2$.

U.S. Pat. No. 4,394,453 (Dumbaugh) describes a glass composition suitable for tungsten-halogen lamps, consisting essentially, expressed in weight percent on the oxide basis, of 60±1.5% $SiO_2$, 17.0±1% $Al_2O_3$, 5.0±0.8% $B_2O_3$, 11.4±0.8% CaO, and 7.5±0.8% MgO. The physical properties of the disclosed glasses are a strain point of at least 670° C., a coefficient of thermal expansion of 42–45×$10^{-7}$/° C., a liquidus temperature below 1100° C., and a liquidus viscosity greater than 20,000 poises.

U.S. Pat. No. 4,409,337 (Dumbaugh) discloses glasses for tungsten-halogen lamps which exhibit a strain point in excess of 665° C., a liquidus temperature no higher than 1125° C., a liquidus viscosity of at least 50,000 poises, and a coefficient of thermal expansion between about 42–46×$10^{-7}$/° C., the composition consisting essentially, in terms of weight percent on the oxide basis, of 56–59% $SiO_2$, 16–17% $Al_2O_3$, 4.5–5.25% $B_2O_3$, 7.5–9.25% CaO, 5.5–6.25% MgO, and 5–9% MgO, wherein the sum of $SiO_2$+$Al_2O_3$, will not exceed about 75%, the weight ratio $SiO_2$:$Al_2O_3$ is maintained between about 3.1–3.7 and the weight ratio CaO:MgO is held between about 1.2–2.0.

U.S. Pat. No. 4,693,987 (Danielson) discloses a glass for use as envelopes for tungsten-halogen lamps especially where molybdenum metal wires are used, the glass having strain points between 718°–725° C., liquidus viscosities of at least 50,000 poises, liquidus temperatures below 1145–1180° C. and coefficients of thermal expansion between 46.2–50.1×10$^{-7}$/° C., consisting essentially, in weight percent, of 10.7–11.9% CaO, 9.1–13.1% BaO, 14.6–15.1% Al$_2$O$_3$, and 60.5–62.4% SiO$_2$.

Correlated Color Temperature (CCT), also referred to herein as lamp color temperature, is used in the lighting industry to describe and compare the color appearance of lamps. CCT refers to the temperature of a blackbody radiator whose perceived color most closely resembles that of a given light source. As the temperature of a blackbody is raised, its color changes from a dull red to bright red, then orange, yellow, white and finally blue. Thus, lower temperatures imply longer wavelengths and "warmer" colors; higher temperatures imply shorter wavelengths and "cooler" colors. In particular, typical automotive tungsten-halogen lamps are warm in color and show CCT ranging from 2800–3200K; a value given by the fact that tungsten-halogen lamps produce much of their light output in the yellow to red wavelength region of the spectrum between 560–700 nm and less in the blue to green wavelength region of the spectrum between 400–560 nm. One method of raising the CCT in tungsten-halogen lamps is to selectively absorb a small percentage of visible radiation in the longer wavelength region (yellow to red) while fully transmitting in the shorter wavelength region (blue to green). In terms of color temperature, absorbing or "subtracting" these higher wavelengths of energy results in a shift in CCT to higher temperatures. A method of absorbing the longer wavelengths is to dope the glass envelope with specific cations in the form of elemental oxide material, in particular neodymium oxide.

Neodymium containing glass is known. It has historically found employment in the aviation and navigation fields. Long recognized as a glass coloring agent, neodymium, a rare-earth element, possesses an absorption spectra that extends over both the visible and invisible regions, transferring practically unchanged to glasses. It is also known that neodymium's major absorption of light is in the yellow region of the visible spectrum, between 568–590 nm. Illuminated objects seen through neodymium containing glass look very clear in the surrounding environment because the red and green tones are accentuated due to the yellow absorption.

Recently, neodymium containing glass has been disclosed in U.S. Pat. No. 5,548,491 (Karpen) for the production of motor vehicle headlights to reduce the visual discomfort from oncoming cars at night. Karpen discloses neodymium doped soda-lime silica glass for incandescent lamps, and neodymium doped borosilicate or quartz glass for tungsten-halogen lamps. Although neodymium oxide in the range of 5–30% by weight is disclosed, there are no specific glass compositions provided.

U.S. Pat. No. 4,315,186 (Hirano et al.) discloses a reflective electric lamp with a neodymium doped front lens section fused to a reflective mirror section. The front lens section only is formed from a neodymium containing glass, Nd$_2$O$_3$ accounting for 0.5–5% by weight. Again no specific glass compositions are disclosed. Borosilicate glass is given as an example of a glass material suitable for the manufacturing of the front lens mirror.

However, what the prior art has failed to do and what this invention provides is a range of compositions within the alkaline earth aluminosilicate system which in combination with Nd$_2$O$_3$ enables optimum tungsten-halogen lamp construction, thereby providing the necessary physical properties for successful and optimum lamp operation, while increasing the CCT above 3200K, preferably above 3400K.

SUMMARY OF THE INVENTION

The present invention resides in neodymium containing glass compositions for tungsten halogen lamp envelopes, as well as for glass filters and glass filter lenses for use with tungsten halogen lamps, the compositions consisting essentially in terms of weight percent on the oxide basis of about 50–62% SiO$_2$, 10–17% Al$_2$O$_3$, 0–6% B$_2$O$_3$, 3.6–10% CaO, 0–7.5% MgO, 0.1–0.3% SrO, 2.4–18% BaO, 0–1% ZnO, 1–8% Nd$_2$O$_3$. Accordingly, it is a principal object of this range of glass compositions to exhibit the following physical properties: strain point between about 665° C. to about 750° C., coefficient of thermal expansion from 25° C. to the glass set point, 5° C. higher than the strain point, between about 49–59×10$^{-7}$/° C., liquidus temperature below about 1320° C., viscosity at liquidus temperature greater than about 2,000 poises up to about 170,000 poises, and transmission at 585 nm from about 5 to 60% for a 1.2 mm thick piece of glass.

In accordance with the present invention, the preferred glass compositions consists essentially, expressed in terms of weight percent on the oxide basis, of about 53–57% SiO$_2$, 13–16.5% Al$_2$O$_3$, 0–5.8% B$_2$O$_3$, 5.3–7.7% CaO, 0–7.4% MgO, 0.1–0.3% SrO, 7.7–18% BaO, 0–0.7% ZnO, 1.5–4.5% Nd$_2$O$_3$. Accordingly, it is a principal object of the preferred range of glass compositions to exhibit the following physical properties: strain point between about 665° C. to about 730° C., coefficient of thermal expansion between about 49–59×10$^{-7}$/° C., liquidus temperature below about 1250° C., viscosity at liquidus temperature greater than about 30,000 poises, and transmission at 585 nm from about 18–60% for a 1.2 mm thick piece of glass.

Another object of the instant invention pertains to an increase in the lamp color temperature, exhibited by a tungsten halogen lamp containing a glass envelope, a glass filter lens, or a glass filter prepared from the preferred glass compositions, from about 3 to 7% above a similar glass with no Nd$_2$O$_3$.

An additional object of the instant invention pertains to the total visible lumen or candle power loss, exhibited by a tungsten halogen lamp containing a glass envelope, a glass filter lens or a glass filter prepared from the preferred glass compositions, limited to less than about 10%.

Additional features and advantages of the invention will be set forth in the detailed description that follows, and in part, will be readily apparent or recognized to those skilled in the art by practicing the invention as described herein.

It is to be understood that both the foregoing general discussion and the following detailed description and examples provided herein are merely exemplary of the invention, and are intended to provide an overview or framework for understanding the nature and character of the invention as it is claimed.

DESCRIPTION OF PREFERRED EMBODIMENTS

Figure 1:
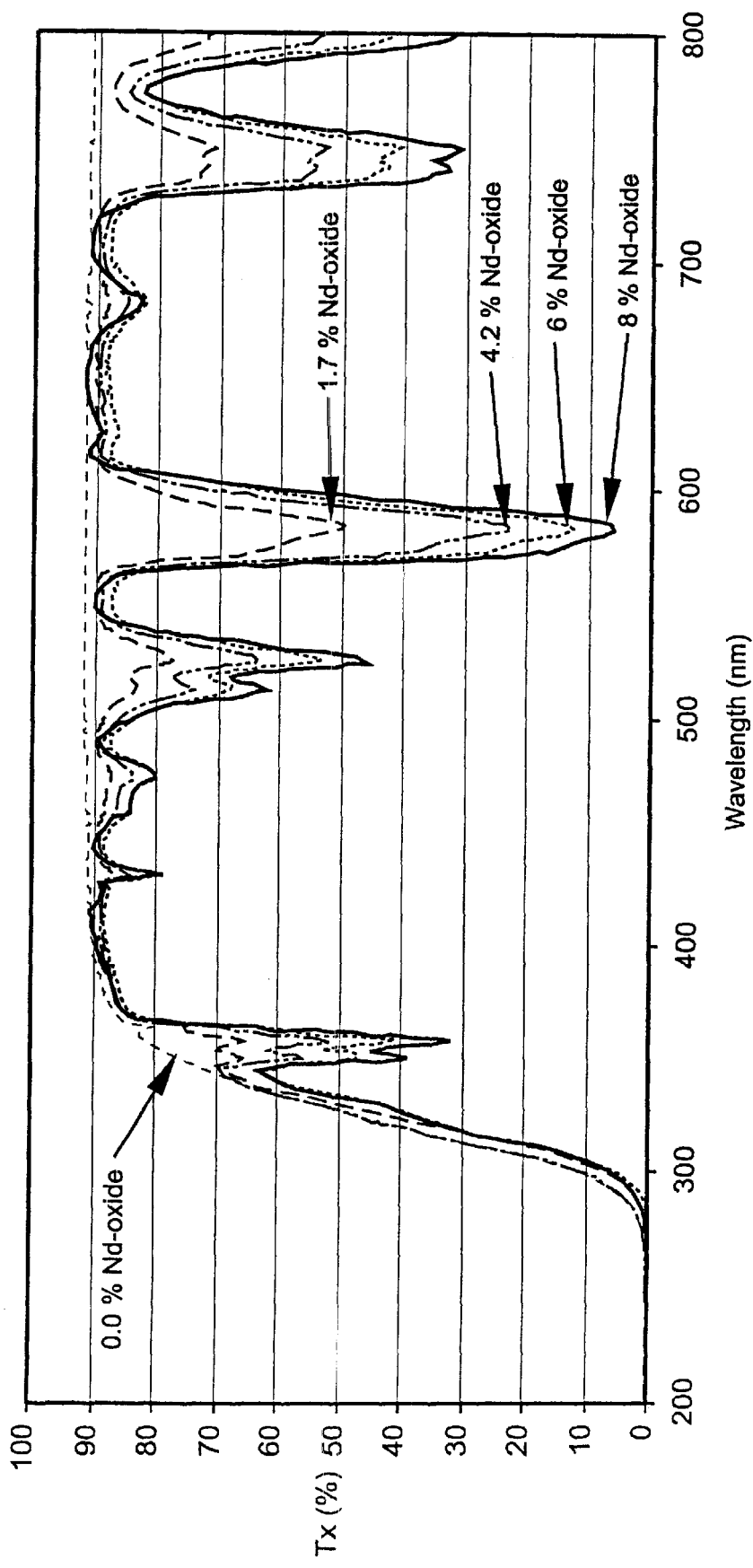
FIG. 1 is a graph illustrating the ultraviolet and visible transmission spectra of the glasses of the present invention as a function of Neodymium Oxide content for a 1.2 mm thick piece of glass.

Referring now to Table I and Table II therein are presented a number of glass compositions and the physical properties exhibited by these glasses, respectively, defining the parameters of the present invention.

TABLE I

|  | 1 | 2 | 3 | 4 | 5 | 6 | 7 | 8 | 9 | 10 |
|---|---|---|---|---|---|---|---|---|---|---|
| $SiO_2$ | 56.2 | 56.3 | 56.3 | 56.4 | 55.9 | 56.3 | 55.0 | 56.0 | 56.1 | 54.5 |
| $Al_2O_3$ | 16.2 | 16.2 | 16.2 | 16.2 | 16.1 | 16.2 | 15.9 | 16.1 | 16.2 | 15.7 |
| $B_2O_3$ | 4.89 | 4.91 | 4.67 | 4.52 | 4.46 | 4.61 | 4.10 | 4.47 | 4.59 | 4.85 |
| CaO | 8.16 | 6.95 | 7.32 | 7.72 | 7.27 | 7.47 | 6.60 | 7.44 | 6.92 | 6.97 |
| MgO | 5.66 | 5.55 | 5.54 | 5.55 | 5.50 | 5.54 | 5.42 | 5.52 | 5.53 | 5.01 |
| SrO | 0.14 | 0.25 | 0.25 | 0.26 | 0.25 | 0.26 | 0.24 | 0.26 | 0.25 | 0.24 |
| BaO | 8.24 | 7.92 | 7.9 | 7.92 | 7.85 | 7.91 | 7.73 | 7.87 | 7.88 | 7.99 |
| ZnO | 0 | 0 | 0 | 0 | 0 | 0 | 0.68 | 0.7 | 0.7 | 0 |
| $Nd_2O_3$ | 0 | 1.74 | 1.73 | 1.30 | 2.58 | 1.59 | 4.24 | 2.16 | 1.73 | 4.24 |

|  | 11 | 12 | 13 | 14 | 15 | 16 | 17 | 18 | 19 | 20 |
|---|---|---|---|---|---|---|---|---|---|---|
| $SiO_2$ | 56.3 | 55.6 | 55.9 | 56.1 | 55.7 | 54 | 53 | 53.1 | 52.2 | 52.3 |
| $Al_2O_3$ | 16.2 | 16.0 | 16.1 | 16.2 | 16 | 15.5 | 15.2 | 15.3 | 16.1 | 15.7 |
| $B_2O_3$ | 4.79 | 4.95 | 4.89 | 4.89 | 5.01 | 4.98 | 5 | 5.24 | 5.25 | 5.54 |
| CaO | 7.14 | 7.40 | 7.20 | 7.11 | 7.31 | 5.6 | 5.86 | 5.32 | 5.33 | 5.34 |
| MgO | 5.55 | 5.53 | 5.45 | 5.39 | 5.46 | 5.26 | 4.21 | 4.35 | 4.36 | 4.37 |
| SrO | 0.25 | 0.14 | 0.14 | 0.13 | 0.14 | 0.21 | 0.22 | 0.21 | 0.21 | 0.21 |
| BaO | 7.91 | 8.15 | 8.14 | 7.94 | 8.15 | 8.03 | 8.01 | 8.03 | 8.04 | 8.05 |
| ZnO | 0 | 0 | 0 | 0 | 0 | 0 | 0 | 0 | 0 | 0 |
| $Nd_2O_3$ | 1.74 | 1.73 | 1.73 | 1.73 | 1.73 | 6.02 | 7.97 | 7.98 | 8 | 8.01 |

|  | 21 | 22 | 23 | 24 | 25 | 26 | 27 | 28 | 29 | 30 |
|---|---|---|---|---|---|---|---|---|---|---|
| $SiO_2$ | 53.4 | 53.4 | 53.1 | 51.8 | 50.4 | 55 | 55.7 | 53.5 | 54.2 | 52.9 |
| $Al_2O_3$ | 16 | 15.9 | 15.7 | 15.5 | 15.3 | 15.8 | 16.1 | 15.4 | 15.6 | 15.2 |
| $B_2O_3$ | 4.98 | 5.1 | 4.75 | 4.69 | 4.63 | 4.86 | 4.87 | 3.87 | 2.98 | 5.56 |
| CaO | 5.6 | 5.6 | 7.93 | 7.84 | 7.73 | 7.29 | 7.29 | 5.54 | 5.54 | 5.28 |
| MgO | 5.23 | 5.23 | 5.5 | 5.43 | 5.36 | 4.95 | 4.97 | 4.96 | 4.96 | 4.32 |
| SrO | 0.22 | 0.22 | 0.25 | 0.25 | 0.24 | 0.19 | 0.14 | 0.22 | 0.22 | 0.21 |
| BaO | 8.04 | 8.04 | 8 | 7.91 | 7.8 | 5.43 | 2.44 | 8.06 | 8.06 | 8.06 |
| ZnO | 0 | 0 | 0 | 0 | 0 | 0 | 0 | 0 | 0 | 0 |
| $Nd_2O_3$ | 6.02 | 4.25 | 4.25 | 6.02 | 8.01 | 5.96 | 7.95 | 7.94 | 7.94 | 7.94 |

|  | 31 | 32 | 33 | 34 | 35 | 36 | 37 | 38 | 39 | 40 |
|---|---|---|---|---|---|---|---|---|---|---|
| $SiO_2$ | 50.6 | 54.7 | 52.6 | 54.4 | 54.6 | 59.1 | 56.6 | 60.5 | 60.5 | 61.7 |
| $Al_2O_3$ | 16.1 | 10 | 15.1 | 16.3 | 16 | 13.9 | 13.9 | 13.9 | 16.4 | 16.3 |
| $B_2O_3$ | 4.86 | 4.86 | 4.87 | 4.86 | 4.92 | 0 | 0 | 0 | 0 | 0.4 |
| CaO | 8.08 | 8.08 | 3.67 | 6.61 | 6.61 | 6.54 | 6.54 | 6.55 | 6.55 | 11.6 |
| MgO | 5.6 | 5.6 | 5.44 | 4.95 | 4.95 | 0 | 0 | 6.09 | 6.09 | 0.1 |
| SrO | 0.25 | 0.25 | 0.19 | 0.14 | 0.14 | 0.42 | 0.42 | 0.23 | 0.23 | 0.28 |
| BaO | 8.06 | 8.06 | 8.06 | 8 | 8 | 17.9 | 17.9 | 8 | 8 | 6.45 |
| ZnO | 0 | 0 | 0 | 0 | 0 | 0 | 0 | 0 | 0 | 0.99 |
| $Nd_2O_3$ | 5.95 | 7.94 | 7.94 | 4.25 | 4.25 | 1.68 | 4.16 | 4.17 | 1.69 | 1.69 |

|  | 41 | 42 | 43 | 44 |
|---|---|---|---|---|
| $SiO_2$ | 61.7 | 56.9 | 56.9 | 56.9 |
| $Al_2O_3$ | 16.3 | 16.4 | 16.4 | 16.4 |
| $B_2O_3$ | 0.4 | 1.49 | 0 | 1.49 |
| CaO | 10.1 | 6.95 | 6.95 | 7.44 |
| MgO | 0.1 | 6.85 | 6.85 | 7.34 |
| SrO | 0.25 | 0.24 | 0.24 | 0.24 |
| BaO | 6.45 | 8.04 | 8.04 | 8.04 |
| ZnO | 0 | 0 | 0 | 0 |
| $Nd_2O_3$ | 4.17 | 4.17 | 4.17 | 1.69 |

TABLE II

|  | 1 | 2 | 3 | 4 | 5 | 6 | 7 | 8 | 9 | 10 |
|---|---|---|---|---|---|---|---|---|---|---|
| Strain Point (° C.) | 680 | 685 | 682 | — | 668 | — | 683 | 677 | 678 | 677 |
| Coef. Of Exp. ($\times 10^{-7}$/° C.) | 52 | 49 | 50 | — | 57 | — | 54 | 57 | 59 | 51 |
| Liq (° C.) | 1100 | — | — | — | — | — | — | — | 1100 | — |
| Liq Viscos ($\times 10^3$ poise) | 70 | — | — | — | — | — | — | — | 80 | — |
| Tx. (at 585 nm) | 91 | 50 | 50 | 59 |  | 53 | 22 | 45 | — | 24 |

|  | 11 | 12 | 13 | 14 | 15 | 16 | 17 | 18 | 19 | 20 |
|---|---|---|---|---|---|---|---|---|---|---|
| Strain Point (° C.) | 679 | 674 | 680 | 680 | 676 | 685 | 686 | 686 | 687 | 685 |
| Coef. Of Exp. ($\times 10^{-7}$/° C.) | 50 | 51 | 50 | 49 | 50 | 50 | 52 | 51 | 50 | 54 |

TABLE II-continued

|  | | | | | | | | | | |
|---|---|---|---|---|---|---|---|---|---|---|
| Liq. (° C.) | — | 1075 | — | — | — | 1145 | — | 1150 | 1130 | 1125 |
| Liq. Viscos. (× 10³ poise) | — | 170 | — | — | — | 30 | — | 29 | — | — |
| Tx. (at 585 nm) | 50 | 50 | 52 | 50 | 52 | 13 | 7 | 7 | 5 | 5 |

|  | 21 | 22 | 23 | 24 | 25 | 26 | 27 | 28 | 29 | 30 |
|---|---|---|---|---|---|---|---|---|---|---|
| Strain Point (° C.) | 685 | 686 | 679 | 683 | 678 | 685 | 688 | 688 | 695 | 676 |
| Coef. Of Exp. (× 10⁻⁷/° C.) | 52 | 51 | 54 | 57 | 56 | 51 | 49 | 52 | 52 | 50 |
| Liq. (° C.) | 1120 | 1120 | — | — | — | 1170 | 1195 | 1140 | 1180 | 1110 |
| Liq. Viscos. (× 10³ poise) | — | — | — | — | — | 17 | 11 | 36 | 19 | 70 |
| Tx. (at 585 nm) | 10 | 11 | 21 | 10 | 5 | 11 | 6 | 5 | 5 | 5 |

|  | 31 | 32 | 33 | 34 | 35 | 36 | 37 | 38 | 39 | 40 |
|---|---|---|---|---|---|---|---|---|---|---|
| Strain Point (° C.) | 677 | 666 | 681 | 689 | 687 | 726 | 727 | 720 | 723 | 745 |
| Coef. Of Exp. (× 10⁻⁷/° C.) | 55 | 49 | 59 | 51 | 51 | 54 | 55 | 50 | 51 | 50 |
| Liq. (° C.) | 1135 | 1225 | 1160 | 1100 | 1105 | 1290 | 1240 | 1275 | 1285 | 1270 |
| Liq. Viscos. (× 10³ poise) | 14 | 2 | 19 | 102 | 100 | — | — | — | — | — |
| Tx. (at 585 nm) | 11 | 5 | 5 | — | — | 49 | 19 | 19 | 49 | 50 |

|  | 41 | 42 | 43 | 44 |
|---|---|---|---|---|
| Strain Point (° C.) | 747 | 704 | 719 | 705 |
| Coef. Of Exp. (× 10⁻⁷/° C.) | 51 | 52 | 53 | 55 |
| Liq. (° C.) | 1315 | 1190 | 1235 | 1220 |
| Liq. Viscos. (× 10³ poise) | — | — | — | — |
| Tx. (at 585 nm) | 20 | 20 | 20 | 48 |

In Table I, inasmuch as the sum of the individual components totals or very closely approximates 100, for all practical purposes the reported values may be deemed to reflect weight percent. The actual batch ingredients may comprise any materials, either oxides or other compounds, which, upon being melted together, will be converted into the desired oxides in the proper proportions. To illustrate, $CaCO_3$ can be utilized as the source of CaO.

The batch materials were compounded, ballmilled together to assist in the production of a homogenous melt, and charged into platinum crucibles. The crucibles were placed into a furnace, and the batches were melted at about 1600 to 1650° C. for about 16 hours. The crucibles were then removed from the furnace. Annealing took place at temperatures in the range of 720° C. to 780° C., followed by slow cooling to room temperature.

In Table II, the physical properties presented are strain point, coefficient of thermal expansion (Coef. of Exp.), liquidus temperature (Liq.), and the viscosity at the liquidus temperature (Liq. Vis.). Strain point is reported in terms of degrees Celsius (° C.). Coef. of Exp. is determined over the range of 25 to the glass set point (5° C. above the strain point) and is recorded in terms of (×10⁻⁷/° C.). Liq. is reported in degrees Celsius (° C.), and Liq. Vis. is reported in (10³ poises). The percent transmission (Tx.) is also provided and is presented at a wavelength of 585 nm; all samples for determining the percent transmission were tested at 1.2 mm thickness.

The strain point provides an indication of the thermal endurance exhibited by a glass during lamp operation, as well as the temperature near where stresses begin to develop in glass-to-metal seals. A glass suitable for the manufacturing of high temperature lamp envelopes should have a strain point of at least about 660° C.

The thermal expansion of the glass is an important parameter related to sealing of the glass to molybdenum lead wires at the lamp base. In order to provide the best stress range for the glass-to-metal seal the thermal expansions of the glass and metal at the glass set point (5° C. above strain point) should be close enough to avoid high stress buildup at the glass to metal seal along the lamp lead wires. In the case of tungsten-halogen lamps, good seals of the glass to molybdenum metal lead wires are obtained when the thermal expansion difference caused mismatch strain is held to less than 500 ppm. For glasses with strain points in the range of 660 to 750° C. the thermal expansion caused strain mismatch is less than 500 ppm when their coefficients of thermal expansion (RT—set point temperature) are in the range of 49–59×10⁻⁷/° C. The coefficient of thermal expansion of molybdenum is about 54×10⁻⁷/° C. in the set point temperature range of aluminosilicate glasses used for tungsten-halogen lamp envelopes.

The liquidus temperature is the highest temperature where crystals begin to grow when a glass is very slowly cooled. Glass held for a long time at this temperature will crystallize or devitrify. Generally the lower the liquidus temperature the more resistant a glass is toward devitrification because it's viscosity will be higher. The Vello tube drawing process requires glass to have viscosity greater than about 30,000 poise to form tubes with good dimensional quality. In order to avoid devitrification during tube formation the viscosity of the glass at its liquidus temperature should be greater than about 30,000 poise. The Danner tube making process has a slower production rate, but it can form glass tubing as low as 2000 to 7000 poises viscosity, and glasses can be pressed at viscosities above about 1000 poises.

Also in the aluminosilicate glasses, liquidus temperatures of glasses greater than about 1250° C. generally indicate that the melting temperatures required to make homogeneous glasses must also be very high, such that glass melting furnaces would be rapidly corroded by such high temperature glasses. The brief furnace campaigns between re-builds would make such glasses uneconomical to manufacture.

Example 1 is provided as a comparative example and contains no neodymium oxide. Examples 2–44 are inventive and provide the parameters of the present invention.

The range of glass compositions of the present invention consists essentially in terms of weight percent on the oxide basis of 50–62% $SiO_2$, 10–17% $Al_2O_3$, 0–6% $B_2O_3$, 3.6–10% CaO, 0–7.5% MgO, 0.1–0.3% SrO, 2.4–18% BaO, 0–1% ZnO, 1–8% $Nd_2O_3$. This range of glass compositions exhibit the following physical properties: strain point between about 665° C. to about 750° C., coefficient of thermal expansion between about 49–59×10$^{-7}$/° C., liquidus temperature below about 1320° C., viscosity at liquidus temperature greater than about 2,000 poises up to at least about 170,000 poise, and transmission at 585 nm of about 5 to 60% for a 1.2 mm thick piece of glass.

Although most of the example compositions in TABLE I meet the required thermal expansion and strain point ranges to be used as lamp envelopes, some glasses, like Examples 36 and 38–41 would not be manufacturable by typical Vello tubing processing due to having liquidus temperatures above 1250° C., because of excessive corrosion of the melting tank refractory lining. Additionally, Example 37 is borderline manufacturable by typical tubing processing at 1240° C. liquidus temperature. Examples 26, 27, 29, and 31–33 are not manufacturable by Vello tubing processes due to having too low of a viscosity at the liquidus temperature (below about 30,000 poise). Alternative methods of producing glass lamp envelopes comprising compositions not conducive to Vello tube processing, such as Examples 26, 27, 29, 31–33 and 36–41, include but are not limited to the Danner tube drawing process, split-mold pressing and blow mold processing. Glass filter lenses and glass filters for use with tungsten halogen lamps and manufactured from the compositions of the instant invention are typically made by pressing, or similar such processes.

Referring now to FIG. 1, therein illustrated is a graph showing the ultra-violet and visible transmission spectra of selected glass compositions of the present invention as a function of $Nd_2O_3$, at levels of 1.7 wt. %, 4.2 wt. %, 6 wt. %, and 8 wt. %, Examples 12, 10, 16 and 18 respectively, as well as comparative Example 1, which contains 0.0 wt % $Nd_2O_3$. TABLE III illustrates the increase in CCT for three sizes of halogen lamps when filter glasses having the above $Nd_2O_3$ levels are placed in front of them compared to the same base glass with no $Nd_2O_3$ content. It is the shift of the color coordinates (x-chroma, y-chroma) from the absorptions in the glass that raise the CCT as a function of the $Nd_2O_3$ content. As shown in FIG. 1 a much higher amount of yellow light is absorbed in the region of 580 nm due to the $Nd_2O_3$, and this dominates the chromaticity and CCT change. The percentage increase of the CCT for the three lamp types with $Nd_2O_3$ content of the filters is listed in parentheses in TABLE III.

TABLE III

| Lamp Type | Nd-glass filter | x-chroma | y-chroma | CCT (K) | ΔCCT from 0% Nd |
|---|---|---|---|---|---|
| 9004 Standard | None (lamp only) | 0.420 | 0.400 | 3377 | N/A |
| 9004 | 0% | 0.420 | 0.395 | 3235 | 0 (0%) |
| | 1.7% | 0.412 | 0.388 | 3336 | 101 (3.0%) |
| | 4.2% | 0.404 | 0.379 | 3436 | 201 (5.8%) |
| | 6% | 0.399 | 0.372 | 3475 | 245 (6.9%) |
| | 8% | 0.397 | 0.367 | 3490 | 255 (7.3%) |
| 9005 Standard | None (lamp only) | 0.397 | 0.391 | 3690 | N/A |
| 9005 | 0% | 0.409 | 0.39 | 3421 | 0 (0%) |
| | 1.7% | 0.400 | 0.382 | 3544 | 123 (3.5%) |
| | 4.2% | 0.392 | 0.373 | 3664 | 429 (6.6%) |
| | 6% | 0.388 | 0.367 | 3712 | 291 (7.8%) |
| | 8% | 0.384 | 0.361 | 3761 | 340 (9.0%) |
| 9006 Standard | None (lamp only) | 0.406 | 0.394 | 3506 | N/A |
| 9006 | 0% | 0.416 | 0.394 | 3308 | 0 (0%) |
| | 1.7% | 0.408 | 0.386 | 3412 | 104 (3.0%) |
| | 4.2% | 0.400 | 0.378 | 3508 | 200 (5.7%) |
| | 6% | 0.396 | 0.371 | 3548 | 240 (6.8%) |
| | 8% | 0.392 | 0.365 | 3582 | 274 (7.6%) |

However, as FIG. 1 shows there are also additional absorptions centered on other visible wavelengths of about 430, 475, 511, 525, 683, 736 and 750 nm so that along with the 580 nm region absorption there is also an increase in the absorption of total visible light (400–760 nm), especially at higher levels of $Nd_2O_3$ in glass. This means that a lamp constructed with a $Nd_2O_3$ glass containing envelope would transmit less total light, i.e., there is a lumen loss factor.

TABLE IV shows radiometry determined measures of relative candle power for a 9004 tungsten-halogen lamp with these same filter glasses. The 8 wt. % $Nd_2O_3$ glass filter causes a 14.8% loss of candle power or lumens (% CP loss or % lumen loss) compared to the glass with no $Nd_2O_3$. This finding is of particular relevance because lamps having envelopes containing higher amounts of $Nd_2O_3$, i.e., at levels great than about 6 wt. %, particularly at levels greater than about 8 wt %, would have to have significantly different filament constructions for higher power emission to compensate for this high lumen loss factor, in order to have enough light projected onto the road and surroundings. However, there is a disadvantage from need of higher filament emission since it could cause a significant reduction in the lifetime of the lamp. Therefore, in order to minimize % CP or % lumen loss, the optimum amount of $Nd_2O_3$ present in glass compositions used in lamps is preferably less than about 6 wt. %, and more preferably from about 1.5–4.5 wt %.

TABLE IV

| % Nd2O3 Filter | Readings @ Watts | | | | |
|---|---|---|---|---|---|
| | Volts | Amps | Watts | Relative Candle Power | % CP Loss |
| 0.0 | 12.8 | 3.54 | 45.3 | 7.22 | 0.0 |
| 1.7 | 12.8 | 3.54 | 45.3 | 6.9 | 4.4 |
| 2.6 | 12.8 | 3.54 | 45.3 | 6.81 | 5.7 |
| 4.2 | 12.8 | 3.54 | 45.3 | 6.58 | 8.9 |
| 6.0 | 12.8 | 3.54 | 45.3 | 6.38 | 11.6 |
| 8.0 | 12.8 | 3.54 | 45.3 | 6.15 | 14.8 |

Figure 2:
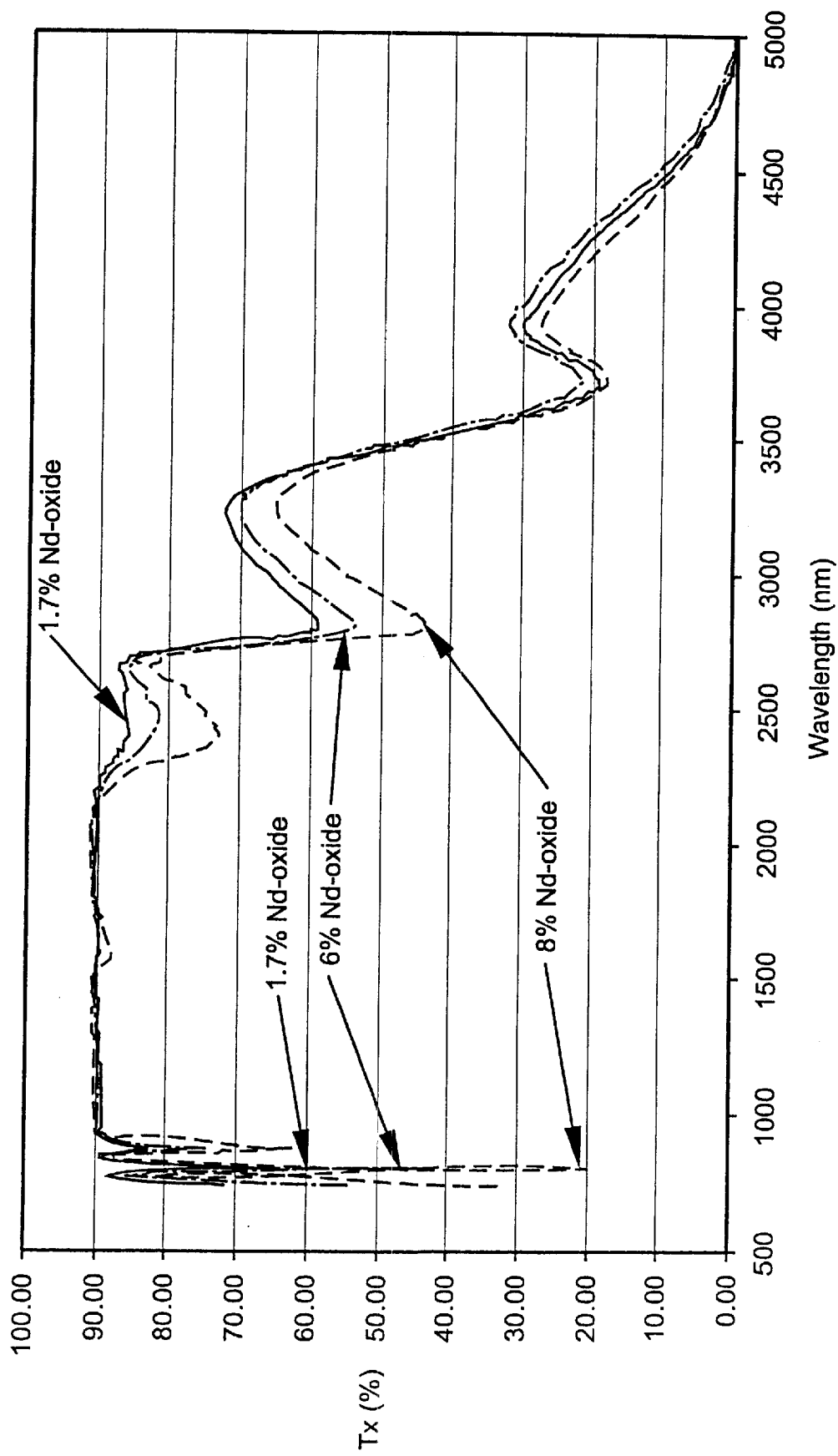
FIG. 2 is a graph illustrating the infrared transmission spectra of glasses of the present invention as a function of Neodymium Oxide content for a 1.2 mm thick piece of glass.

Referring now to FIG. 2, therein illustrated is a graph showing the infrared transmission spectra of selected glass compositions of the present invention as a function of $Nd_2O_3$, at levels of 1.7 wt. %, 6 wt. %, and 8 wt. %. Again, the graph shows that at higher levels of $Nd_2O_3$, i.e., at about 6–8 wt. %, the glasses absorb higher amounts of infrared light energy. An increase in infrared energy absorption increases the temperature of the glass envelope such that it is contemplated, especially in smaller lamps, that the strain point of the glass could be approached which reduces the thermal endurance of the lamp during operation, due to resulting slow deformation of the glass. Therefore, in order to minimize excessive infrared absorption potential problems related thereto, the optimum amount of $Nd_2O_3$ present in glass compositions used in glass lamp envelopes comprising the same is preferably less than about 6 wt. %, and more preferably from about 1.5–4.5 wt %.

According to the findings shown FIGS. 1 and 2 as well as TABLE IV, it is contemplated that at high levels of $Nd_2O_3$, i.e., higher than about 5 wt. %, there is greater than about 10% lumen or CP loss factor. Additionally, the temperature of the glass during operation of smaller diameter lamps could approach the strain point of the glass, thus reducing thermal endurance of the lamp envelope.

As stated herein above, an objective of the present invention is to provide a range of glass compositions in the alkaline earth aluminosilicate system which increases the CCT of a tungsten-halogen lamp to above 3200 K, most preferably above 3400 K. As discussed herein above, the CCT increases with an increase in $Nd_2O_3$. However, as seen from FIGS. 1 and 2, as well as from TABLE IV, levels of $Nd_2O_3$ greater than about 5 wt %, particularly from about 6–8 wt. % have the disadvantage of reducing the lumens emitted from the lamp, as well as increasing the temperature of the glass envelope. However, it should be noted that glass compositions according to instant invention that contain greater than about 5 wt % $Nd_2O_3$, particularly from about 6–8 wt. % $Nd_2O_3$, while not representing the optimum range of $Nd_2O_3$, do favorably increases the CCT of a tungsten-halogen lamp above 3400 K as demonstrated in Table III.

Therefore, for the most ideal lamp operation it has been determined that the most preferred glass compositions consist essentially, expressed in terms of weight percent on the oxide basis, of 53–57% $SiO_2$, 13–16.5% $Al_2O_3$, 0–5.8% $B_2O_3$, 5.3–7.7% CaO, 4.9–7.4% MgO, 0.1–0.3% SrO, 7.7–8.5% BaO, 0–0.7% ZnO, 1.5–4.5% $Nd_2O_3$. This most preferred range of glass compositions exhibit the following physical properties: strain point between about 665° C. to about 730° C., coefficient of thermal expansion between about 49–59×10$^{-7}$/° C., liquidus temperature below 1250° C., viscosity at liquidus temperature greater than 30,000 poises, and transmission at 585 nm of between 18–60% for a 1.2 mm thick piece of glass.

Although the now preferred embodiments of the invention have been set forth, it will be apparent to those skilled in the art that various changes and modifications may be made thereto without departing from the spirit and scope of the invention as set forth in the following claims.

What is claimed is:

1. Glass compositions suitable as an envelope for a tungsten halogen lamp, consisting essentially in terms of weight percent on the oxide basis, of about 50–62% $SiO_2$, 10–17% $Al_2O_3$, 0–6% $B_2O_3$, 3.6–10% CaO, 0–7.5% MgO, 0.1–0.3% SrO, 2.4–18% BaO, 0–1% ZnO, 1–8% $Nd_2O_3$, and exhibiting a strain point between about 665° C. to about 750° C., a coefficient of thermal expansion from 25° C. to the set point, 5° C. above the glass strain point, between about 49–59×10$^{-7}$/° C., a liquidus temperature below about 1320° C., a viscosity at the liquidus temperature greater than about 2,000 poises, and a transmission at 585 nm of about 5 to about 60% for a 1.2 mm thickness.

2. The glass according to claim 1 wherein the amount, expressed in terms of weight percent on the oxide basis, of $Nd_2O_3$ is about 1.5–6%.

3. The glass according to claim 1, wherein a lamp color temperature for a tungsten halogen lamp containing a glass envelope prepared from said glass compositions is increased from about 3 to 7% above a similar glass with no $Nd_2O_3$, and the total visible lumen loss is limited to less than about 10%.

4. The glass according to claim 1 consisting essentially, expressed in terms of weight percent on the oxide basis, of about 53–57% $SiO_2$, 13–16.5% $Al_2O_3$, 0–5.8% $B_2O_3$, 5.3–7.7% CaO, 0–7.4% MgO, 0.1–0.3% SrO, 7.7–18% BaO, 0–0.7% ZnO, 1.5–4.5% $Nd_2O_3$, and exhibiting a strain point between about 665° C. to about 730° C., a liquidus temperature below 1250° C., a viscosity at the liquidus temperature greater than about 30,000 poises, and a transmission at 585 nm of between about 18 to 60% for a 1.2 mm thickness.

5. The glass according to claim 4, wherein a lamp color temperature for a tungsten halogen lamp containing a glass envelope prepared from said glass compositions is increased from about 3 to 7% above a similar glass with no $Nd_2O_3$, and the total visible lumen loss is limited to less than about 10%.

6. A glass envelope suitable for a tungsten halogen lamp prepared from a glass composition consisting essentially, in terms of weight percent on the oxide basis, of about 50–62% $SiO_2$, 10–17% $Al_2O_3$, 0–6% $B_2O_3$, 3.6–10% CaO, 0–7.5% MgO, 0.1–0.3% SrO, 2.4–18% BaO, 0–1% ZnO, 1–8% $Nd_2O_3$, and exhibiting a strain point between about 665° C. to about 750° C., a coefficient of thermal expansion from 25° C. to the set point, 5° C. above the glass strain point, between about 49–59×10$^{-7}$/° C., a liquidus temperature below about 1320° C., a viscosity at the liquidus temperature greater than about 2,000 poises, and a transmission at 585 nm from about 5 up to about 60% for a 1.2 mm thickness.

7. The glass envelope according to claim 6, expressed in terms of weight percent on the oxide basis, wherein the amount of $Nd_2O_3$ is about 1.5–6%.

8. The glass envelope according to claim 6, wherein a lamp color temperature of a tungsten-halogen lamp containing said glass envelope is increased from about 3 to 7% above a similar glass with no $Nd_2O_3$, and the total visible lumen loss is limited to less than about 10%.

9. The glass envelope according to claim 6, wherein said glass compositions consisting essentially, expressed in terms of weight percent on the oxide basis, of about 53–57% $SiO_2$, 13–16.5% $Al_2O_3$, 0–5.8% $B_2O_3$, 5.3–7.7% CaO, 0–7.4% MgO, 0.1–0.3% SrO, 7.7–18% BaO, 0–0.7% ZnO, 1.5–4.5% $Nd_2O_3$, and exhibiting a strain point between about 665° C. to about 730° C., a liquidus temperature below about 1250° C., a viscosity at the liquidus temperature greater than about 30,000 poises, and a transmission at 585 nm of from about 18 to 60% for a 1.2 mm thickness.

10. The glass envelope according to claim 9, wherein a lamp color temperature of a tungsten-halogen lamp containing said glass envelope is increased from about 3 to 7% above a similar glass with no $Nd_2O_3$, and the total visible lumen loss is limited to less than about 10%.

11. A glass filter suitable for a tungsten halogen lamp prepared from a glass composition consisting essentially in terms of weight percent on the oxide basis of about 50–62% $SiO_2$, 10–17% $Al_2O_3$, 0–6% $B_2O_3$, 3.6–10% CaO, 0–7.5% MgO, 0.1–0.3% SrO, 2.4–18% BaO, 0–1% ZnO, 1–8% $Nd_2O_3$, and exhibiting a strain point between about 665° C. to about 750° C., a coefficient of thermal expansion from 25° C. to the set point, 5° C. above the glass strain point, between about $49$–$59 \times 10^{-7}/°$ C., a liquidus temperature below about 1320° C., a viscosity at the liquidus temperature greater than about 2,000 poises, and a transmission at 585 nm from about 5 up to about 60% for a 1.2 mm thickness.

12. The glass filter according to claim 11, expressed in terms of weight percent on the oxide basis, wherein the amount of $Nd_2O_3$ is about 1.5–6%.

13. The glass filter according to claim 11, wherein a lamp color temperature of a tungsten-halogen lamp containing said glass filter is increased from about 3 to 7% above a similar glass with no $Nd_2O_3$, and the total visible lumen loss is limited to less than about 10%.

14. The glass filter according to claim 11, wherein said glass compositions consisting essentially, expressed in terms of weight percent on the oxide basis, of about 53–57% $SiO_2$, 13–16.5% $Al_2O_3$, 0–5.8% $B_2O_3$, 5.3–7.7% CaO, 0–7.4% MgO, 0.1–0.3% SrO, 7.7–18% BaO, 0–0.7% ZnO, 1.5–4.5% $Nd_2O_3$, and exhibiting a strain point between about 665° C. to about 730° C., a liquidus temperature below about 1250° C., a viscosity at the liquidus temperature greater than about 30,000 poises, and a transmission at 585 nm of from about 18 to 60% for a 1.2 mm thickness.

15. The glass filter according to claim 14, wherein a lamp color temperature of a tungsten-halogen lamp containing said glass filter is increased from about 3 to 7% above a similar glass with no $Nd_2O_3$, and the total visible lumen loss is limited to less than about 10%.

16. The glass filter according to claim 11, wherein said glass filter is a lens.

* * * * *